Sept. 12, 1972   J. M. LAW   3,690,853
METHOD OF MAKING HIGH RESOLUTION IMAGE TRANSMITTING
FIBER OPTICS BUNDLES
Filed Aug. 19, 1970   2 Sheets-Sheet 1
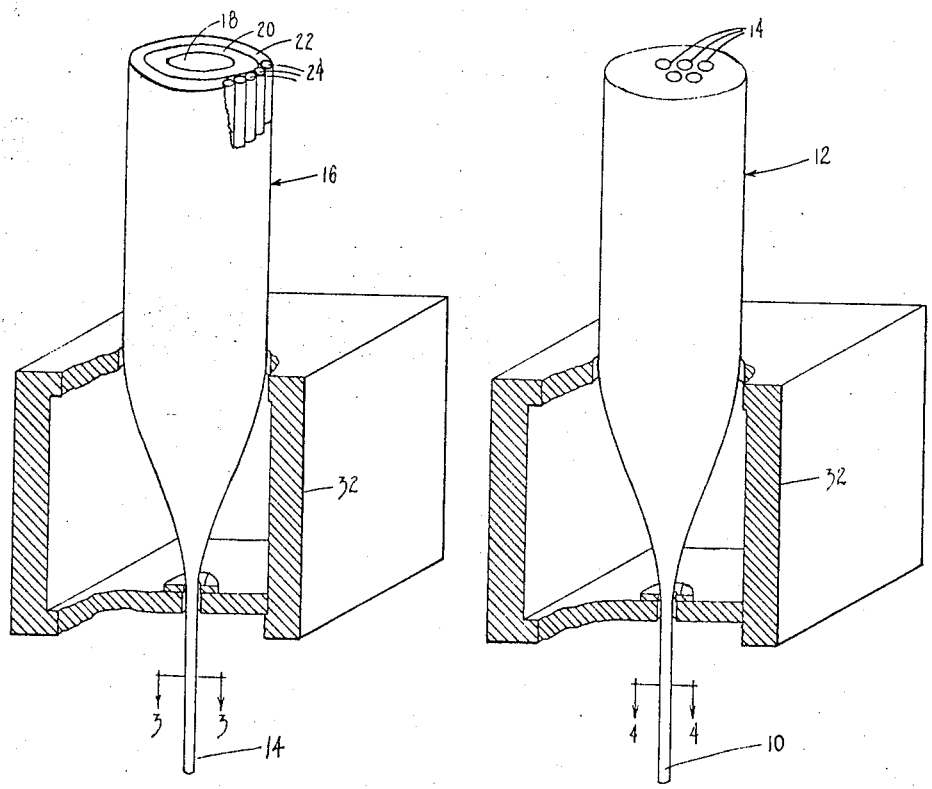
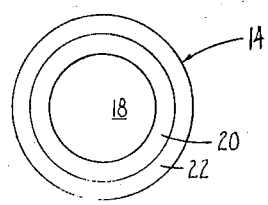
FIG. 1
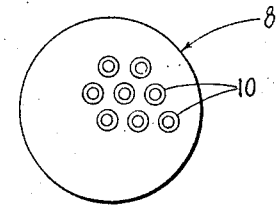
FIG. 2
FIG. 3
FIG. 4
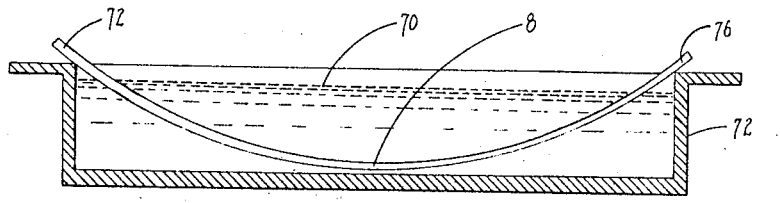
FIG. 5
INVENTOR.
JACK M. LAW
BY Townsend and Townsend
ATTORNEYS Sept. 12, 1972 J. M. LAW 3,690,853
METHOD OF MAKING HIGH RESOLUTION IMAGE TRANSMITTING
FIBER OPTICS BUNDLES
Filed Aug. 19, 1970 2 Sheets-Sheet 2

INVENTOR.
JACK M. LAW
BY Townsend and Townsend
ATTORNEYS

United States Patent Office 3,690,853
Patented Sept. 12, 1972

3,690,853
METHOD OF MAKING HIGH RESOLUTION IMAGE TRANSMITTING FIBER OPTICS BUNDLES
Jack M. Law, Mountain View, Calif., assignor to Optics Technology, Inc., Palo Alto, Calif.
Filed Aug. 19, 1970, Ser. No. 65,041
Int. Cl. C03c 15/00, 23/20
U.S. Cl. 65—4
4 Claims

ABSTRACT OF THE DISCLOSURE

A large number of light-transmitting conventionally clad glass rods enveloped or supercladded with a bonding material are gathered, aligned, heated and stretched while maintained in alignment to reduce their diameter and bond them to each other to form a bundle of mutually aligned fibers. The material for the light-transmitting rods is selected so that it withstands a chemical solution in which the bonding material is soluble. Intermediate portions of the rod are immersed in the solution to dissolve the bonding material from between the individual fibers while the ends of the fibers remain embedded therein, fixed with respect to each other and in their original, mutually aligned position.

BACKGROUND OF THE INVENTION

Image transmitting fiber optics bundles as such are known. Initially individual fiber optics were carefully stacked next to each other in specially constructed jigs, and, thereafter, the ends of the fiber optics were grasped and secured to retain the fiber optic ends in their initially stacked positions. The portion of the fiber optics intermediate the ends remained free and could be flexed. However, since both ends of the bundle were in the same alignment image transmission was possible.

By carefully aligning and grasping the fiber optics acceptable image transmitting fiber optics bundles could be constructed. However, the image resolution was usually low and the cost of producing the bundles, principally due to the tedious and time consuming manual stacking of the large number of fiber optics, was high.

More recently, attempts have been made to increase the quality of image transmitting fiber optic bundles while reducing the cost thereof. One such attempt initially forms so-called fiber optic "multiples" which generally comprise a plurality of some 20 to 30 individual fiber optics drawn together under heat so that the outer glass cladding disposed about the central cores of the fiber optics bonds the fibers together. Such multiples are drawn down to as little as .0025 inch.

The exterior of each multiple is then cladded with glass dissolvable in chemical solution to which the individual fiber optics are inert. A multiplicity of cladded multiples is aligned into bundles which are heated and again drawn down in size to yield the final image transmitting fiber optics bundle. Portions of the bundle between the ends are the immersed in the chemical solution to dissolve the second cladding between the multiples.

This approach, although it yields substantial cost reductions and enhances the transmitted image quality, is not fully satisfactory from several points of view. Most importantly, each multiple represents a cluster of rigidly interconnected fibers. The flexibility of one multiple is substantially less than the flexibility of the individual fibers so that breakage of multiples from excess flexure is not uncommon. Moreover, once a multiple is broken the image portions transmitted by each fiber optics in the multiple is lost. Thus, for satisfactory image transmission and service life such bundles must be handled with great care and may not be excessively flexed.

Due to virtually unavoidable imperfections in the aligning of the multiples, sheer distortion, caused by lateral offsets between adjacent multiples, is usually encountered and causes reduction in the transmitted image quality. Furthermore, the transmitted image exhibits a distracting "chicken wire effects," that is a background shadow effect produced along the outlines of the adjoining multiples.

SUMMARY OF THE INVENTION

The present invention provides a method for constructing high quality image transmitting fiber optics bundles at relatively low cost. In its broadest form the method comprises the steps of providing a plurality of relatively large diameter light transmitting glass rods and applying a supercladding to the rods. The supercladding is constructed of a material dissolvable in a chemical solution to which the light transmitting glass rod is inert. The supercladded rods are heated and drawn to relatively small cross section and, thereafter, cooled. A multiplicity of drawn, supercladded fiber optics are mutually aligned so that the relative position of the fiber optics ends at one end of the bundle is the same as the relative position of the fiber optics end at the other end of the bundle. Thereafter, the bundle is heated and drawn to relatively small cross section whereby the supercladding on each of the reduced cross section fiber optics firmly bonds the fiber optics in the bundle to each other. After cooling the drawn bundle is severed into suitable lengths and a portion of the bundle between the ends thereof is immersed in the chemical solution to dissolve the supercladding between the bundle ends. The individual fiber optics thereby become flexible while the fiber ends at the bundle end remain embedded in the supercladding and in mutual alignment to thus permit the transmission of images.

As used in this specification, the term "mutually aligned" or "mutually aligned fibers" means like relative positions of the fiber optics in a bundle at each end of the bundle whether or not such alignment occurs in portions of the bundle between the bundle end; and the term "supercladding" or "outermost fiber optics cladding" denotes materials such as certain types of glass which are applied to individual fiber optics in accordance with the present invention and which are dissolvable in a chemical solution to which the fiber optics is inert.

The method of the present invention enables the construction of high quality image trasmitting fiber optics bundles at relatively low cost. When the initially drawn supercladded fiber optics are nested for the drawing of the fiber bundle the supercladding on each fiber bonds to the supercladding on the surrounding and thus maintains the fibers in the bundle in mutual alignment over their full length. This in turn virtually eliminates migrations of the fibers during or after the drawing step as could take place when the fibers were loosely disposed within a prior art multiple provided with only exterior supercladding.

Moreover, as a result of the substantially precise registration of the fibers in finished bundles constructed in accordance with the invention the final fiber size can be substantially greater than was heretofore possible without compromising the resolution of the transmitted image. For example, certain prior art flexible fiber optics bundles required individual fiber diameters of as little as 5 to 6 microns to obtain usable transmitted images. With the present invention high resolution images of equal or better quality are obtained with fiber diameters of as much as 10 to 12 microns.

As a result, the cross section of the fibers need not be reduced as much as was heretofore necessary so that relatively large image transmitting fiber optics bundles of up to about ¼ inch in diameter can be successfully drawn from individually mutually aligned, single fiber optics that have been supercladded in accordance with the invention. The virtually precise alignment of the individual fibers over their entire length substantially eliminates sheer distortion. Furthermore, and in contrast with the prior art, since no multiples are generally necessary for final fiber optics bundles of up to about ¼ inch in diameter no chicken wire effect is encountered. Thus, by virtue of the present invention flexible image transmission yielding an image resolution substantially better than heretofore possible, without appreciable sheer distortion and without the chicken wire effect are obtained.

In instances where multiples are employed, as for the construction of fiber optic bundles having diameters in excess of about ¼ inch, the mutiples are preferably given a square or hexagonal cross section. This enables a precise nesting of the multiples without the formation of voids between them into which supercladding must flow during the drawing step. Multiple migration and sheer distortion are thus eliminated.

After the final draw to the final fiber optics diameter, the supercladding between all individual fiber optics in the bundle and between the bundle ends, which remain embedded to retain them in their mutual alignment, is dissolved. Consequently, each fiber optics in the bundle is individually flexible. The bundle of the present invention therefore exhibits a flexure rate substantially in excess over that encountered with prior art bundles employing bonded fiber optics multiples. Moreover, should breakage occur only single fiber optics break whereas in the prior art bundle all fibers in the multiple break and prevent the transmission of image portions through relatively large number of fiber optics. The bundle constructured according to the invention is, therefore, substantially less susceptible to damage, does not need as much care in handling it as do prior art bundles, and has a substantially longer service life expectancy than prior art bundles.

BRIEF DESCRIPTION OF THE DRAWINGS

FIG. 1 is a fragmentary, schematic elevational view illustrating the drawing of a supercladded fiber optic in accordance with the invention;

FIG. 2 is a fragmentary, schematic elevational view similar to FIG. 1 and illustrates the drawing of a supercladded fiber optics assembly in accordance with the present invention;

FIG. 3 is a grossly enlarged plan view of an initially drawn, supercladded fiber optic and is taken on line 3—3 of FIG. 1;

FIG. 4 is a grossly enlarged plan view, in section, of a round, image transmitting fiber optic bundle and illustrates the relative positioning and the bonding of disproportionately enlarged individual fibers;

FIG. 5 is a schematic elevational view illustrating the immersion of fiber optics bundle in a chemical solution to dissolve the supercladding between the ends of the bundle.

DESCRIPTION OF THE PREFERRED EMBODIMENTS

Figure 6:
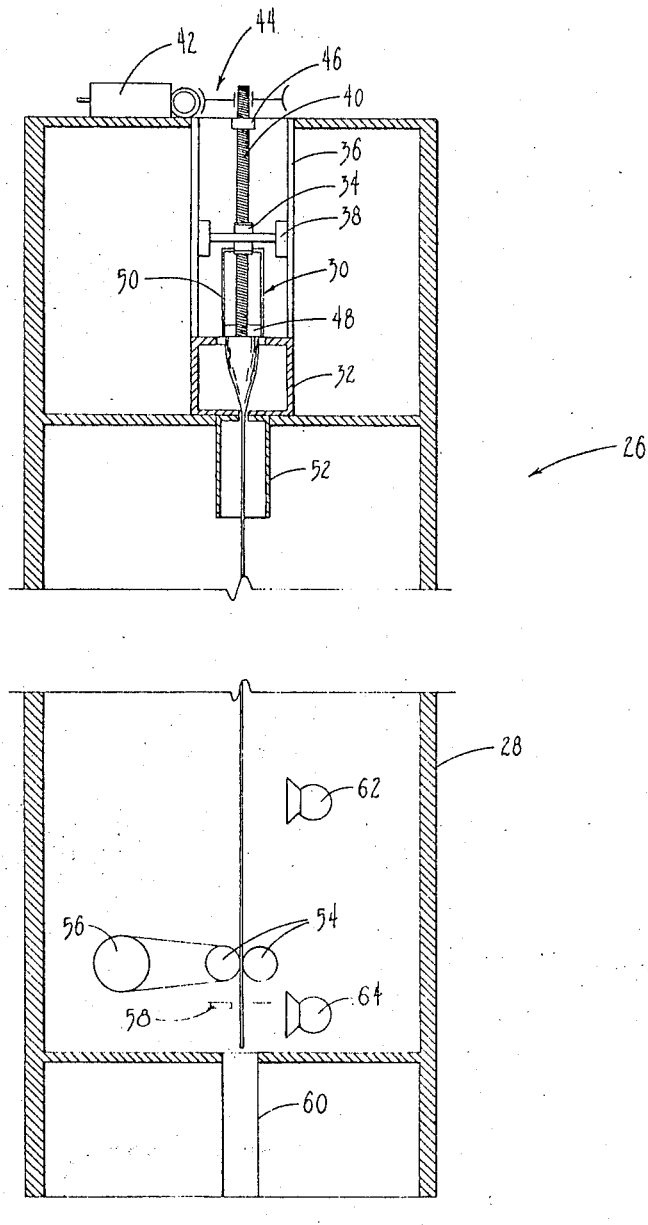
FIG. 6 is a schematic elevational view illustrating the apparatus for drawing the fiber optic and fiber optic bundle in accordance with the invention.

Referring to FIGS. 1 through 4, an image transmitting fiber optics bundle 8 comprises a multiplicity of mutually aligned fiber optics 10 which are bonded together to maintain their mutual alignment and which is drawn from a relatively large diameter glass rod assembly 12. The rod assembly comprises a like multiplicity of supercladded light transmitting glass rods or canes 14 which are nested so that they are in the same relative position over their full length.

Each supercladded light transmitting glass rod 14 is constructed from a blank 16 defined by an inner, cylindrical core 18 constructed of relatively high index of refraction glass, a cylindrically tubular sleeve 20 disposed around the core and constructed of relatively low index of refraction glass and cylindrically tubular member 22 disposed about the sleeve. After the blank has been drawn into rod 14 member 22 defines the supercladding thereof. Alternatively to the use of tubular member 22 a plurality of elongate supercladding glass rods 24 (fragmentally illustrated in a broken-out portion of FIG. 1) can be placed about sleeve 20. The supercladding rods have a diameter about equal to the wall thickness of tubular member 22 and suitable means such as wire harness (not shown) is provided which firmly grasps the supercladding rods and compresses them against the exterior of the sleeve for the subsequent drawing operation.

The selection of the materials for core 18, sleeve 20 and supercladding member 22 or rods 24 is critical and must meet the following criteria. First, to obtain light transmission through the drawn rod the core and the sleeve must have differing indexes of refraction as indicated above. Secondly, the core and the sleeve must be constructed of glass which is inert to a chemical solution in which the material of supercladding member 22 or supercladding rods 24 is dissolvable. Thirdly, the material for the core, the sleeve and the supercladding member must have compatible or substantially equal coefficients of expansion to prevent internal stresses and a cracking of the finish drawn rod 14 when subjected to temperature differences as during cooling after hot drawing of the rod. Lastly, the material of which a supercladding member 22 or rods 24 is constructed must be capable of withstanding the maximum glass drawing temperature. The supercladding material must be relatively soft at that temperature to enable the shaping of its outer surface and to assure good bonds between adjacent glass rods when rod assembly 12 is drawn to fiber optics bundle 8. Thus, the supercladding material will usually be glass although other materials can be employed if they exhibit the necessary physical and chemical characteristics.

Referring now briefly to FIG. 6, a drawing machine 26 particularly well adapted for practicing the method of the present invention comprises a relatively high support structure 28 which, at its upper end, mounts a holder assembly 30 and a two stage furnace 32. The holder assembly generally comprises a lead nut 34 guided along upright guide bars 36 by suitable laterally extending guide arms 38 and engaged by a lead screw 40 actuated by a motor 42 via worm gear drive 44 and a clutch 46.

An upper end 48 of rod assembly 12 or blank 16 is grasped by suitable clamps 50 connected to lead nut 34 and so positioned that the axis of the rod assembly is aligned with a vertical aperture through furnace 32.

An anneal tube 52 extending downwardly from the furnace is concentric with the lower aperture in the furnace. It protects the drawn glass rod or fiber optics bundle exiting from the furnace against air drafts and too rapid cooling which can cause temporary internal stresses and cracking of the glass.

Mounted at the lower end of support structure 28 and vertically spaced from the furnace a substantial distance of as much as 14 feet or more are a pair of opposing, counter rotating draw wheels 54 actuated by drive motor 56. The draw wheels are axially aligned with the apertures in furnace 32, and therewith the axis of rod assembly 12 or blank 16, and include relatively high friction peripheries for engaging the bundle or rod and continuously drawing it downwardly. A suitable pendulum cutter 58 or the like is disposed downstream of the draw wheels and severs like lengths of the bundle or the rod which drop into a receptacle 60 for subsequent use. A pair of blowers 62 and 64 are disposed upstream and downstream of the draw wheels and, respectively, fully cool the bundle rod before it enters between the draw wheels and prevent glass chips and the like from dropping into the receptacle.

Motors 42 and 56 are variable speed motors that are synchronized so that the speed with which draw wheels 54 move the bundle or rod downwardly causes a corresponding, substantially slower movement of lead nut 34 and, therewith, of rod assembly 12 or blank 16 into the furnace.

Referring now to FIGS. 1 through 6, and turning to the method of the present invention, upper end 48 of a blank 16 is secured to clamps 50 and lowered into furnace 32. The lower end of the blank as grasped by suitable means (not separately shown) and after the portion of the rod disposed in the furnace has attained sufficient temperature the lower rod end is drawn through the furnace until it is between draw wheels 54. The draw wheels are now engaged with the glass rod, drive motor 56 is actuated and blank 16 is continuously drawn until its full volume, except for a portion adjacent upper end 48 thereof, has passed through orifice 66 and has thus been formed into a light transmitting, supercladded glass rod. Normally the glass rods have cross sectional dimensions between about 1/64 inch to about 1/16 inch.

During the drawing the materials of core 18, sleeve 20 and supercladding member 22 or rods 24 are softened and intimately adhered to each other to thereby form the light transmitting glass rod 14 provided with an exterior supercladding.

The drawn glass rod 14 is cut into equal lengths and a multiplicity of them are then nested in mutual alignment to form rod assembly 12. The ends of the rod assembly are secured as with a wire harness (not separately shown). The rod assembly is grasped with clamps 50 of lead nut 34, and the lower end of the rod assembly is inserted in furnace 32 for drawing in the above described manner. During the drawing operation the temperature in the furnace softens the three materials of which each rod is constructed to thereby lengthen each of them an equal amount and correspondingly reduce their cross sections. The softened supercladding of each rod is in intimate contact with the supercladding of all adjacent rods, combines therewith and thereby bonds the fiber optics (comprised of the bonded core 18 and sleeve 20) to each other. Their relative positions are thus fixed. Virtually no fiber migration occurs so that the fibers remain in mutual alignment during and after the drawing. Pendulum cutter 58 of drawing machine 26 again severs the fiber optics bundle into desired lengths.

For use in fiber optics bundles having diameters of up to about ¼ inch a sufficient number of glass rods 14 are combined into rod assembly 12 so that the diameters of the fiber optics in the finish-drawn bundle are about 6 to about 12 microns.

If the diameter of the finished fiber optic bundle 8 substantially exceeds about ¼ inch the bundle is constructed of fiber optics multiples. Multiples are small diameter fiber optics bundles constructed by drawing a number, say between about 10,000 to about 30,000, of glass rods 14 into square or preferably hexagonally shaped bundles of cross sectional dimensions between about 1/32 to about 3/32 inch. Thus, multiples comprise fiber bundles at which each individual fiber is bonded to all adjacent fibers. Furthermore, the full exterior of the multiple includes a supercladding layer from the fibers disposed on the periphery of the multiple. A multiplicity of such multiples are then mutually nested and aligned to form a bundle of the desired dimension. The ends of the multiples are bonded to one another over a suitable length, such as ¼ to ½ inch, by a suitable method such as thermal fusion, cementing or epoxying.

Square or hexagonally shaped multiples are obtained by nesting the glass rods 14 so that they are arranged in the desired cross-sectional shape. During the drawing of the multiple they retain their relative position and the drawn multiple thus has the same shape as the original multiple bundle. Square or hexagonally shaped multiples nest when gathered for the final draw and leave no voids between them. This results in a more homogeneous, higher quality finished fiber optics bundle.

The fiber optics bundle length is suitably immersed in a chemical solution 70 disposed in container 72 as schematically illustrated in FIG. 5 so that ends 74 and 76 of the bundle are not contacted by the solution. The solution dissolves the supercladding material and progresses from the exterior of the bundle towards the center. The fiber optics of the bundle ends 74 and 76, irrespective of whether the bundle is constructed of single fiber optics or multiples, become free and independent of each other while the fibers at both ends of the bundle remain mutually aligned. Maximum flexibility of the fibers and the bundle is thus assured. Furthermore, fiber breakages are isolated to single fibers instead of fiber multiples. Thus, light picked up with one end of the bundle is emitted at the other end in the same relative position. Image transmission is thus possible.

To protect the fibers from damage they are surrounded by a flexible protective tube such as a thin-walled plastic hose (not shown), or a flexible metallic tubing. For high image resolution the end faces of the fiber optics bundles are optically ground and polished in a conventional manner. The following example will further facilitate the understanding of the present invention.

EXAMPLE

One inch diameter light transmitting glass rod comprising a high-refractive-index core of flint glass enveloped by a tubular layer of low-refractive-index soda-lime glass is surrounded with about 3/32-inch-diameter supercladding rods constructed of a rare earth glass such as Lanthinum-Thorium Crown glass available from the Jenaer Glasswerk Schott and Gen., Mainz, Germany, under the trademark Schott LaK3 which is soluble in a nitric-hydrochloric acid solution to which the flint and the soda-lime glasses are inert. Moreover, the three glass types exhibit substantially identical coefficients of expansion.

The cladding rods are mechanically constrained to the light transmitting rod with a harness and the resulting assembly is heated in a two-element furnace set to 630/860° C. Thereafter, the assembly is drawn in the above described manner into a round cross section glass rod of an exterior dimension of about 0.01–0.02 inch or less. The high temperature causes adherence of the supercladding rods to the exterior surface of the light transmitting rod where they form a continuous exterior supercladding. After drawing and cooling the rods are cut to lengths of about 12 inches.

A multiplicity of cut rods are now gathered, nested and mutually aligned and mechanically secured to each other with a harness. The resulting rod assembly is again heated, this time in a two-zone furnace set to about 625/825° C. and drawn to an outside diameter of about ¼ inch to form a substantially rigid fiber optics bundle. During the drawing the supercladding of the rods fuses together and establishes a firm bond between the individual fibers to maintain them in their same relative positions throughout their lengths. After the drawing the fiber bundle is cooled and again cut to convenient lengths for subsequent final use.

The light transmitting glass rod assembly is drawn until the individual glass fibers in the fiber bundle have diameters in the order of about 10 microns. Image inspection reveals approximately 42 line pairs per millimeter so that the resolution of images transmitted by the rod is equal or superior to high quality photographic images.

The finished drawn and sized rigid fiber bundle is now immersed in an aqueous solution having about 1% nitric acid, about 1% hydrochloric acid and about 98% water. Other acid solutions, such as hydrochloric or nitric acid solutions alone, citric acid etc. can be substituted as desired. Solutions containing each acid in concentrations from a fraction of a percent to up to several percent have yielded satisfactory results. The ends of the fiber bundle are protected from contact with the solution so that only supercladding disposed between the bundle ends is removed to yield a readily flexible fiber optics bundle. Thereafter, the fiber optics bundle is inserted in a thin-walled plastic tube to prevent damage to the relatively fragile, micron size and otherwise unprotected glass fibers between the bundle ends.

The dissolution of the supercladding in the solution is speeded up by subjecting the bath to stirring or agitation such as ultrasonic vibrations or by suitably increasing the acid concentration.

I claim:

1. A method of forming a flexible, aligned fiber optical bundle comprising the steps of: forming a glass rod having a solid core composed of a first glass, a coaxial cladding formed of a second glass around the core, and an outer shell formed of a third glass, the first glass having a predetermined index of refraction, the second glass having an index of refraction sufficient to cause substantially total internal reflection of light within the core, and the third glass being dissolvable in a solution, the first and second glasses being indissolvable by said solution, all glasses having a substantially equal coefficient of expansion, aligning a plurality of rods of a substantially equal diameter in parallel juxtaposition, fusing the cores through their length by melting the outer shell, heating and drawing the aggregate of rods to a substantially reduced diameter composite rod in which the shells bond adjacent rods to each other over the full lengths of the rods, and rendering the composite rod flexible while maintaining the ends of the individual rods fixed and aligned by immersing only a portion of the composite rod intermediate its ends in a bath of the solution for a sufficient time to dissolve the third glass between the ends of the composite rod while keeping the ends of the composite rod outside the bath, whereby the rods forming the composite rod remain mutually aligned at both ends of the composite rod for the transmission of images.

2. A method according to claim 1 including the steps of gathering a plurality of composite rods and nesting the plurality of composite rods in a multiple bundle, and drawing the multiple bundle to form the fibers.

3. A method according to claim 2 wherein the step of drawing the multiple bundle includes the step of arranging the rods in a hexagonal array for drawing composite rods having a hexagonal cross-section for the subsequent nesting of the composite rods with substantially no void spaces between them.

4. A method according to claim 2 wherein the step of drawing the multiple bundle includes the step of arranging the rods in a square array for drawing composite rods having a square cross-section for the subsequent nesting of the composite rods with substantially no void spaces between them.

References Cited

UNITED STATES PATENTS

| 3,004,368 | 10/1961 | Hicks, Jr. | 65—31 XR |
| 3,050,907 | 8/1962 | Hicks, Jr. et al. | 65—31 XR |
| 3,554,721 | 11/1971 | Gardner | 65—31 XR |
| 3,033,071 | 5/1962 | Hicks, Jr. | 65—LR7 |
| 3,033,731 | 5/1962 | Cole | 65—4 |
| 3,383,192 | 5/1968 | Siegmund | 65—4 |
| 3,278,283 | 10/1966 | Bazinet, Jr. | 65—4 |
| 3,397,022 | 8/1968 | Cole | 65—4 XR |
| 3,294,504 | 12/1966 | Hicks, Jr. | 65—31 XR |

FRANK W. MIGA, Primary Examiner

U.S. Cl. X.R.

65—31, Dig. 7